United States Patent [19]
Berry et al.

[11] Patent Number: 5,656,222
[45] Date of Patent: Aug. 12, 1997

[54] METHOD OF COATING POLYMERIC SUBSTRATES WITH PARTICULATE MATERIALS

[75] Inventors: Michael Richard Berry, Cleveland, England; David Wall, Dalbeattie, Scotland

[73] Assignee: Imperial Chemical Industries PLC, London, United Kingdom

[21] Appl. No.: 456,634

[22] Filed: Jun. 1, 1995

Related U.S. Application Data

[63] Continuation of Ser. No. 885,876, May 20, 1992.

[30] Foreign Application Priority Data

May 21, 1991 [GB] United Kingdom ............... 9110902

[51] Int. Cl.$^6$ .................................................. B28B 11/06
[52] U.S. Cl. ............... 264/131; 264/171.1; 264/173.16; 264/130; 427/180; 427/204; 427/202; 428/143; 428/149; 428/148; 428/147; 428/480
[58] Field of Search ......................... 427/180, 204, 427/202; 264/171.1, 173.16, 131, 130; 428/143, 149, 148, 147, 480

[56] References Cited

U.S. PATENT DOCUMENTS

| | | | |
|---|---|---|---|
| 4,066,820 | 1/1978 | Kelly et al. | 428/483 |
| 4,375,494 | 3/1983 | Stokes | 428/323 |
| 4,615,939 | 10/1986 | Corsi et al. | 428/323 |
| 4,670,319 | 6/1987 | Katoh et al. | 428/141 |
| 4,781,963 | 11/1988 | Utsumi et al. | 428/141 |
| 4,840,836 | 6/1989 | Eyraud | 428/215 |
| 4,898,753 | 2/1990 | Inoue et al. | 427/276 |
| 5,059,470 | 10/1991 | Fukuda et al. | 428/142 |

FOREIGN PATENT DOCUMENTS

| | | | |
|---|---|---|---|
| 0035835 | 9/1981 | European Pat. Off. | B32B 27/08 |
| 0347646 | 12/1989 | European Pat. Off. | B32B 27/20 |
| 2548958 | 1/1985 | France | B32B 3/30 |
| WO86/06024 | 10/1986 | WIPO | B32B 27/20 |

*Primary Examiner*—William Watkins
*Attorney, Agent, or Firm*—Cushman Darby & Cushman IP Group Pillsbury Madison & Sutro LLP

[57] ABSTRACT

A method of producing a composite film by forming a substrate layer of polymeric material having an at least one surface a heat-sealable layer and applying a particulate additive to the exposed surface of the heat-sealable layer with the particulate additive bonding to and/or penetrating into the heat-sealable layer.

The exposed surface of the heat-sealable layer has greater than 100 surface protrusions per mm2 produced by the particulate additive. The surface protrusions have an average peak height in the range from 5 to 400 nm measured from the average level of the surface of the heat-sealable layer.

12 Claims, 1 Drawing Sheet

METHOD OF COATING POLYMERIC SUBSTRATES WITH PARTICULATE MATERIALS

This is a continuation of application No. 07/885,876, filed May 20, 1992, pending.

This invention relates to a polymeric film, and in particular to a composite polymeric film.

BACKGROUND OF INVENTION

It is known that polymeric films often have poor handling properties which may result in difficulties in winding the films into high quality reels and inefficient passage through processing, for example, slitting equipment.

Polyester film composites comprising a layer of homopolyester and a layer of copolyester are described in GB Patent No 1465973. Copolyesters can be used as heat-sealable layers. European Patent No 35835 describes a similar polyester film composite which comprises a filler in the copolyester layer which has an average particle size greater than the thickness of the layer. The filler particles protrude through the copolyester layer yielding a film with food handling properties. However, the aforementioned film can suffer from reduced heat-sealability due to the presence of filler particles which have a particle size greater than the thickness of the heat-sealable layer. In addition, the aforementioned handling property is only achieved at certain heat-sealable layer thickness/filler particle size ratios, such that any variation required in the heat-sealable layer thickness (for example in a different commercial application) necessitates a change in the filler particle size. This situation can result in a range of different fillers being required for different applications. A relatively high concentration of filler may be required in the copolyester layer in order to obtain the required handling properties, which may result in an unacceptable decrease in the optical clarity and an increase in the haze of the film.

We have now developed a composite film which reduces or substantially eliminates at least one or more of the aforementioned problems.

SUMMARY OF INVENTION

Accordingly, the present invention provides a composite film comprising a substrate layer of polymeric material having on at least one surface thereof a heat-sealable layer comprising a particulate additive, the exposed surface of the heat-sealable layer comprising greater than 100 surface protrusions per $mm^2$ produced by the particulate additive, the surface protrusions having an average peak height in the range from 5 to 400 nm measured from the average level of the surface of the heat-sealable layer.

The invention also provides a method of producing a composite film comprising forming a substrate layer of polymeric material having on at least one surface thereof a heat-sealable layer, applying a particulate additive to the exposed surface of the heat-sealable layer, the particulate additive bonding to and/or penetrating into the heat-sealable layer, the exposed surface of the heat-sealable layer comprising greater than 100 surface protrusions per $mm^2$ produced by the particulate additive, the surface protrusions having an average peak height in the range from 5 to 400 nm measured from the average level of the surface of the heat-sealable layer.

DETAILED DESCRIPTION OF THE INVENTION

The substrate of a polymeric film composite according to the invention may be formed from any synthetic, film-forming polymeric material. Suitable thermoplastics materials include a homopolymer or copolymer of a 1-olefine, such as ethylene, propylene and but-1-ene, a polyamide, a polycarbonate, and, particularly, a synthetic linear polyester which may be obtained by condensing one or more dicarboxylic acids or their lower alkyl (up to 6 carbon atoms) diesters, e.g. terephthalic acid, isophthalic acid, phthalic acid, 2,5- 2,6- or 2,7-naphthalenedicarboxylic acid, succinic acid, sebacic acid, adipic acid, azelaic acid, 4,4'-diphenyldicarboxylic acid, hexahydroterephthalic acid or 1,2-bis-p-carboxyphenoxyethane (optionally with a monocarboxylic acid, such as pivalic acid) with one or more glycols, particularly aliphatic glycols, e.g. ethylene glycol, 1,3-propanediol, 1,4-butanediol, neopentyl glycol and 1,4-cyclohexanedimethanol. A polyethylene terephthalate film is particularly preferred, especially such a film which has been biaxially oriented by sequential stretching in two mutually perpendicular directions, typically at a temperature in the range 70° to 125°, and preferably heat set, typically at a temperature in the range 150° to 250°, for example as described in British patent 838708.

The substrate may also comprise a polyarylether or thio analogue thereof, particularly a polyaryletherketone, polyarylethersulphone, polyaryletheretherketone, polyaryletherethersulphone, or a copolymer or thioanalogue thereof. Examples of these polymers are disclosed in EP-A-1879, EP-A-184458 and U.S. Pat. No. 4,008,203, particularly suitable materials being those sold by ICI PLC under the Registered Trade Mark STABAK. The substrate may comprise a poly(arylene sulphide), particularly poly-p-phenylene sulphide or copolymers thereof. Blends of these polymers may also be employed.

Suitable thermoset resin substrate materials include addition—polymerisation resins—such as acrylics, vinyls, bis-maleimides and unsaturated polyesters, formaldehyde condensate resins—such as condensates with urea, melamine or phenols, cyanate resins, functionalised polyesters, polyamides or polyimides.

The polymeric film substrate for production of a composite film according to the invention may be unoriented, or uniaxially oriented, but is preferably biaxially oriented by drawing in two mutually perpendicular directions in the plane of the film to achieve a satisfactory combination of mechanical and physical properties. Simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation. Sequential stretching may be effected in a stenter process by extruding the thermoplastics substrate material as a flat extrudate which is subsequently stretched first in one direction and then in the other mutually perpendicular direction. Generally, it is preferred to stretch firstly in the longitudinal direction, ie the forward direction through the film stretching machine, and then in the transverse direction. A stretched substrate film may be, and preferably is, dimensionally stabilised by heat-setting under dimensional restraint at a temperature above the glass transition temperature thereof.

The polymeric film substrate of the present invention is desirably optically clear, preferably having a wide angle haze, for a 12 μm thick film, of <3.5%, more preferably <1.5%, and particularly <0.5% being measured according to the standard ASTM D 1003-61.

The heat-sealable layer should be capable of forming a heat-seal bond to itself or to the substrate, or preferably to both, by heating to soften the polymeric material of the heat-sealable layer and applying pressure without softening or melting the polymeric material of the substrate layer.

A heat-sealable layer suitably comprises a polyester resin, particularly a copolyester resin derived from one or more dibasic aromatic carboxylic acids, such as terephthalic acid, isophthalic acid and hexahydroterephthalic acid, and one or more glycols, such as ethylene glycol, diethylene glycol, triethylene glycol and neopentyl glycol. Typical copolyesters which provide satisfactory heat-sealable properties are those of ethylene terephthalate and ethylene isophthalate, especially in the molar ratios of from 50 to 90 mole % ethylene terephthalate and correspondingly from 50 to 10 mole % ethylene isophthalate. Preferred copolyesters comprise from 65 to 85 mole % ethylene terephthalate and from 35 to 15 mole % ethylene isophthalate, and especially a copolyester of about 82 mole % ethylene terephthalate and about 18 mole % ethylene isophthalate.

Formation of a heat-sealable layer on the substrate layer may be effected by conventional techniques—for example, by casting the polymer onto a preformed substrate layer. Conveniently, however, formation of a composite sheet (substrate and heat-sealable layer) is effected by coextrusion, either by simultaneous coextrusion of the respective film-forming layers through independent orifices of a multi-orifice die, and thereafter uniting the still molten layers, or, preferably, by single-channel coextrusion in which molten streams of the respective polymers are first united within a channel leading to a die manifold, and thereafter extruded together from the die orifice under conditions of streamline flow without intermixing thereby to produce a composite sheet.

A coextruded sheet is stretched to effect molecular orientation of the substrate, and preferably heat-set. Generally, the conditions applied for stretching the substrate layer will induce partial crystallisation of the heat-sealable polymer and it is therefore preferred to heat set under dimensional restraint at a temperature selected to develop the desired morphology of the heat-sealing layer. Thus, by effecting heat-setting at a temperature below the crystalline melting temperature of the heat-sealable polymer and permitting or causing the composite to cool, the heat-sealable polymer will remain essentially crystalline. However, by heat-setting at a temperature greater than the crystalline melting temperature of the heat-sealing polymer, the latter will be rendered essentially amorphous. Heat-setting of a composite sheet comprising a polyester substrate and a copolyester heat-sealable layer is conveniently effected at a temperature within a range of from 175° to 200° C. to yield a substantially crystalline heat-sealable layer, or from 200° to 250° C. to yield an essentially amorphous heat-sealable layer. An essentially amorphous heat-sealable layer is preferred.

Heat-sealable layers may be disposed on one or both sides of the substrate layer. The film composites may have a total thickness in the range 10 to 500 μm and the or each heat-sealable layer(s) preferably constitute from 1 to 30% of the total composite thickness. The heat-sealable layers preferably have a thickness of up to 50 μm, more preferably up to 10 μm, and especially from 0.5 to 5 μm.

The required handling properties are achieved when the heat-sealable layer comprises greater than 100, preferably less than 5000 surface protrusion peaks per $mm^2$, more preferably from 400 to 2000, particularly from 600 to 1500, and especially from 700 to 900 protrusion peaks per $mm^2$. The average height of a protrusion peak measured from the average level of the surface of the heat-sealable layer is in the range 5 to 400 nm, more preferably from 10 to 200 nm, particularly from 15 to 100 nm, and especially from 20 to 60 nm. It is preferred that greater than 50%, particularly greater than 70%, and especially greater than 90% of protrusion peaks have a height within the aforementioned preferred average height ranges. The shape of the protrusion peaks can also play a significant role in the handling properties of resultant film. The average protrusion peak preferably has a shape (by which is meant the height of a protrusion peak (as defined above) divided by the width of the base of the peak measured at the average level of the surface of the heat-sealable layer) greater than $0.8 \times 10^{-3}$, more preferably in the range from $1.0 \times 10^{-3}$ to $100 \times 10^{-3}$, especially in the range from $1.5 \times 10^{-3}$ to $20 \times 10^{-3}$, and particularly in the range from $2.0 \times 10^{-3}$ to $4.0 \times 10^{-3}$.

The number, size and shape of the protrusion peaks can be determined by any relevant surface analysis technique. Non-contacting methods, such as interferometry are preferred, for example using a Topo-3D Profiler (manufactured by the Wyko Corporation), as herein described in the test methods given below.

The particulate additive for inclusion in the heat-sealable layer should be chemically inert in relation to the polymeric material of the heat-sealable layer and the materials from which it is produced or any other additives in the heat-sealable layer and preferably comprises inorganic particles comprising one or a mixture of natural or synthetic silica, glass beads, calcium borate, calcium carbonate, magnesium carbonate, barium sulphate, calcium silicate, calcium phosphate, aluminium trihydrate, alumino silicates including the hydrated and calcined forms thereof, and titanium dioxide. Other suitable particulate additives include polymeric particles of polymers which melt at a temperature higher than the highest temperatures used in the production of the film composite and/or are immiscible with the heat-sealable polymer. The preferred particulate additive comprises particles of silica, and in particular comprise a type of silica known commercially as fumed or pyrogenic silica. Fumed silica can be formed by reacting silicone tetrachloride in an oxygen flame to form single, spherical particles of silicone dioxide. The aforementioned particles grow through collision and coalescence to form larger particles, ie primary particles. As the particles cool and begin to freeze, but continue to collide, they stick but do not coalesce, forming solid aggregates which in turn continue to collide to form clusters or agglomerates.

The particulate filler suitable for use in the heat-sealable layer of a composite film according to the present invention is preferably of substantially circular cross-section irrespective of the selected viewing point. Desirably, an individual filler particle exhibits an aspect ratio $d_1:d_2$ (where $d_1$ and $d_2$, respectively, are the maximum and minimum dimensions of the particle) in a range of from 1:1 to 1:0.5, and preferably from 1:1 to 1:0.8.

The average particle size (by which is meant the number average particle diameter) of the particulate filler, particularly silica particles, incorporated into the heat-sealable layer is suitably in a range from 0.01 to 0.09 μm, preferably 0.02 to 0.08 μm, and especially 0.03 to 0.06 μm.

Particle sizes may be measured by electron microscope, coulter counter or sedimentation analysis and the average particle size may be determined by plotting a cumulative distribution curve representing the percentage of particles below chosen particle sizes.

In the case of spherical particulate additives the average size of the particles is determined as the diameter of the particles. However, many particulate additives, especially inorganic particles, are non-spherical in shape and for the purposes of this specification their average size is determined as the size of the particles in their greatest dimension.

In a preferred embodiment of the invention, the primary or individual filler particles aggregate to form clusters or agglomerates comprising a plurality of primary particles. The aggregation process of the primary filler particles may take place during the actual synthesis of the filler and/or during the film making process. It is intended that the average particle size values contained herein apply to the size of the primary non-agglomerated particles. It is preferred that the average particle size of the filler agglomerates, such as agglomerates of primary silica particles, in the heat-sealable layer of the final composite film product is in a range from 0.05 to 0.45 μm, preferably 0.08 to 0.4 μm, and especially 0.1 to 0.35 μm.

The particulate additive may be added to the heat-sealable polymer before extrusion thereof, such that the particulate additive is effectively evenly distributed throughout the layer, preferably present in the layer in an amount up to 10%, more preferably up to 5% by weight based upon the weight of the heat-sealable polymeric material. In general, suitable film handling properties may be provided by amounts of the particulate additive up to 3% by weight and especially in the range 0.5 to 2.0% by weight of the polymeric material.

The presence of the particulate additive distributed throughout the heat-sealable layer can have a detrimental effect on the transparency of the composite film, and in a preferred embodiment of the invention the particulate additive is applied to the exposed surface of the heat-sealable layer, preferably in a liquid medium, such as a dispersion in an organic solvent(s), and preferably as an aqueous dispersion. The liquid medium may optionally include a plasticiser for the heat-sealable layer. Examples of compounds which may be suitable as plasticising agents for polyester heat-sealable layers include benzaldehyde, benzyl alcohol, methyl salicylate, o-dichlorobenzene, dimethyl phthalate, diethyl oxalate, diethyl succinate tetrachloroethane, o-phenylphenol, 1-phenylethanol and dichloromethane. Alternatively, the particulate additive may be applied to the heat-sealable layer in the dry state as a gas cloud, by electrostatic deposition, or from a fluidised bed optionally with electrostatic assistance. When applied in the dry state, the particulate additive may, if desired, be spread over the heat-sealable layer to provide a reasonably uniform distribution over the entire surface.

If desired, slight pressure may be applied over the layer of the particulate additive to impress the particles into the heat-sealable layer. Excess particulate additive which has not bonded or penetrated into the heat-sealable layer may be removed from the surface thereof, e.g. by inverting the composite film, by dispersing the particles with a blast of air, or by brushing or washing the particles away. The composite film may be allowed to cool in air or may be quenched to complete the bonding of the particles to the heat-sealable layer and the cooling or quenching operation may be effected either before or after the excess particles have been removed from the surface of the film.

The particulate additive may be applied to an already oriented film. However, application of the particulate additive is preferably effected before or during the stretching operation.

In particular, it is preferred that the particulate additive medium should be applied to the film substrate between the two stages (longitudinal and transverse) of a biaxial stretching operation. Such a sequence of stretching and coating is especially preferred for the production of a coated copolyester heat-sealable layer bonded to a linear polyester film substrate, such as a polyethylene terephthalate substrate, which is preferably firstly stretched in the longitudinal direction over a series of rotating rollers, coated, and then stretched transversely in a stenter oven, preferably followed by heat setting. During the heat setting process the film is preferably heated to a temperature higher than the softening point of the heat-sealable layer so that the particulate additive sinks into the polymer layer. The particulate additive preferably sinks just below the polymer surface layer so that it is fully submerged within the layer yet confined to the surface region of the heat-sealable layer. Greater than 90%, preferably greater than 95% of the particles are preferably within the upper 1 μm, preferably the upper 0.5 μm thick portion of the heat-sealable layer. The result is that the majority of particles within the layer produce a surface protrusion, preferably having an average peak height of greater than 5 nm.

The particulate additive composition may be applied to the heat-sealable layer as an aqueous dispersion or solution in an organic solvent by any suitable conventional coating technique such as dip coating, bead coating, reverse roller coating or slot coating. The particulate additive is preferably applied to the heat-sealable layer as a dispersion, preferably in aqueous media, at a concentration within the range 2 to 15%, more preferably from 4 to 8%.

In a preferred embodiment of the invention a composite film exhibits high optical clarity and low haze, preferably having a wide angle haze, being measured according to the standard ASTM D 1003-61, of <8%, more preferably <6%, particularly <5%, and especially <3% for a 15 μm thick film. The aforementioned optical characteristics can be suitably achieved by having little or no particulate additive present in the substrate. The substrate may contain relatively small quantities of filler material, for example due to the normal practice of using reclaimed film in the film manufacturing process. The optical properties of the composite film can be further enhanced by not including any additional particulate additive in the polymer of the heat-sealable layer prior to film formation, ie so that essentially all the particulate additive present in the heat-sealable layer results from coating the particulate additive onto the surface thereof.

However, in an alternative embodiment of the invention the composite film is opaque, which is defined as a film exhibiting a Transmission Optical Density (Sakura Densitometer; type PDA 65; transmission mode)/film thickness (in mm) ratio of from 7.5 to 17.5, and particularly of from 12.0 to 15.0. Opacity of the composite film is preferably achieved by having an opaque substrate layer. The substrate layer is conveniently rendered opaque by incorporation into the synthetic polymer of an effective amount of an opacifying agent. However, in a preferred embodiment of the invention the opaque substrate layer is voided, ie comprises a cellular structure containing at least a proportion of discrete, closed cells It is therefore preferred to incorporate into the substrate polymer an effective amount of an agent which is capable of generating an opaque, voided substrate layer structure. Suitable voiding agents, which also confer opacity, include an incompatible resin filler, a particulate inorganic filler or a mixture of two or more such fillers.

By an "incompatible resin" is meant a resin which either does not melt, or which is substantially immiscible with the substrate polymer, at the highest temperature encountered during extrusion and fabrication of the layer. Such resins include polyamides and olefin polymers, particularly a homo- or co-polymer of a mono-alpha-olefin containing up to 6 carbon atoms in its molecule, for incorporation into polyester films, or polyesters of the kind hereinbefore described for incorporation into polyolefin films.

Particulate inorganic fillers suitable for generating an opaque, voided substrate layer include conventional inorganic pigments and fillers, and particularly metal or metalloid oxides, such as alumina, silica and titania, and alkaline metal salts, such as the carbonates and sulphates of calcium and barium. Barium sulphate is a particularly preferred filler which also functions as a voiding agent.

Non-voiding particulate inorganic fillers may also be added to the film-forming polymeric substrate layer.

Suitable voiding and/or non-voiding fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or alter the degree to which the filler is compatible with the substrate polymer.

Production of a substrate layer having satisfactory degrees of opacity, voiding and whiteness requires that the filler should be finely-divided, and the average particle size thereof is desirably from 0.1 to 10 μm provided that the actual particle size of 99.9% by number of the particles does not exceed 30 μm. Preferably, the filler has an average particle size of from 0.1 to 10 μm, and particularly preferably from 0.2 to 0.75 μm. Decreasing the particle size improves the gloss of the substrate.

It is preferred that none of the filler particles incorporated into the substrate layer should have an actual particle size exceeding 30 μm. Particles exceeding such a size may be removed by sieving processes which are known in the art. However, sieving operations are not always totally successful eliminating all particles greater than a chosen size. In practice, therefore, the size of 99.9% by number of the particles should not exceed 30 μm. Most preferably the size of 99.9% of the particles should not exceed 20 μm.

Incorporation of the opacifying/voiding agent into the substrate layer polymer may be effected by conventional techniques—for example, by mixing with the monomeric reactants from which the polymer is derived, or by dry blending with the polymer in granular or chip form prior to formation of a film therefrom.

The amount of filler, particularly of barium sulphate, incorporated into the substrate layer polymer desirably should be not less than 5% nor exceed 50% by weight, based on the weight of the polymer. Particularly satisfactory levels of opacity and gloss are achieved when the concentration of filler is from about 8 to 30%, and especially from 15 to 20%, by weight, based on the weight of the substrate layer polymer. Other additives, generally in relatively small quantities, may optionally be incorporated into the substrate layer. For example, china clay may be incorporated in amounts of up to 25% to promote voiding, optical brighteners in amounts up to 1500 parts per million to promote whiteness, and dyestuffs in amounts of up to 10 parts per million to modify colour, the specified concentrations being by weight, based on the weight of the substrate polymer.

In a film composite typically having a heat-sealable layer thickness in the range 2 to 4 μm, an 8% by weight aqueous dispersion of silica particles having a primary average particle size in the range 30 to 50 nm, are coated onto the heat-sealable layer to create a surface concentration of protrusion peaks projecting from the surface of the secondary layer in the range 700 to 900 per $mm^2$ and having an average peak height in the range 20 to 60 nm. Such a surface provides excellent handling properties and heat-sealing properties in film composites comprising a biaxially oriented and heat-set polyethylene terephthalate substrate layer and a 70 to 85 mole % ethylene terephthalate/30 to 15 mole % ethylene isophthalate copolyester heat-sealable layer represented by a static coefficient of friction for the heat-sealable layer tested against itself in the range 0.50 to 0.65 and a heat-seal strength measured by sealing the heat-sealable layer to itself in the range 200 to 1500 $Nm^{-1}$.

The film composites according to the present invention are suitable for heat sealing to themselves or to the surfaces of other films such as polyethylene terephthalate films using conventional heat-sealing apparatus and conditions whereby the seal is formed by heating the film composite to a temperature at which the essentially amorphous heat-sealable layer is softened and bonded to the receptive surface. Heat-sealable layers comprising a 70 to 85 mole % ethylene terephthalate/30 to 15 mole % ethylene isophthalate copolyester are particularly suitable for heat sealing. A composite film according to the invention preferably exhibits a heat-seal strength measured by sealing the heat-sealable layer to itself of >200, more preferably >300, and particularly >400 $Nm^{-1}$.

The film composites according to the invention also have acceptable handling properties, preferably exhibiting a static coefficient of friction of <1.0, more preferably <0.8, and particularly <0.65.

Modification of the surface of the substrate and/or heat-sealable layer(s), e.g. by flame treatment, ion bombardment, electron beam treatment, ultra-violet light treatment or preferably by corona discharge, may improve the adhesion of any subsequently applied layers, e.g. metallised layers, but may not be essential to the provision of satisfactory adhesion.

The preferred treatment by corona discharge may be effected in air at atmospheric pressure with conventional equipment using a high frequency, high voltage generator, preferably having a power output of from 1 to 20 kw a potential of 1 to 100 kv. Discharge is conveniently accomplished bypassing the film over a dielectric support roller at the discharge station at a linear speed preferably of 1.0 to 500 m per minute. The discharge electrodes may be positioned 0.1 to 10.0 mm from the moving film surface.

The layers of a composite film according to the invention may conveniently contain any of the additives conventionally employed in the manufacture of polymeric films. Thus, agents such as dyes, pigments, voiding agents, lubricants, anti-oxidants, anti-blocking agents, surface active agents, slip aids, gloss-improvers, prodegradants, ultra-violet light stabilisers, viscosity modifiers and dispersion stabilisers may be incorporated in the substrate and/or heat-sealable layer(s), as appropriate.

In this specification the following test methods have been used to determine certain properties of the film composites:

The characteristics of the protrusion peaks were measured using a Topo-3D Profiler (manufactured by the Wyko Corporation). Statistical summit (ie, protrusion peak) analysis was performed having a 5 nm cutoff height and >5 nm threshold value, in order to yield the number of summits or protrusion peaks. The average height (the height being measured from the average level of the surface of the heat-sealable layer) of a protrusion peak was calculated from the resulting probability plot as the value in nanometers at which the height of 50% of all peaks fall below. The shape, ie height/width, of a protrusion peak was determined by measuring the height of a protrusion peak (as defined above and dividing by the width of the base of the peak measured at the average level of the surface of the heat-sealable layer. An average height/width value for 10 typical protrusion peaks was calculated.

The heat-seal strength was measured by sealing the heat-sealable layer to itself at 140° C. for 1.0 second under a pressure of 103 kPa (15 psi), cooling to room temperature, and measuring the force required under linear tension per unit width of seal to peel the sealed films apart at a constant speed of 4.23 m/second.

The static coefficient of friction of the heat-sealable layer was measured against itself by an inclined plane method based on ASTM test D 4518-87, using a Model IPST (Specialist Engineering, Welwyn, UK).

Wide angle haze was determined as the percentage of transmitted light which deviates from the normal to the surface of the film by an average amount greater than 2.5° of arc during passage through the film, essentially according to ASTM test D 1003-61, using a Hazegard XL211 Hazemeter (BYK Gardner, US).

BRIEF DESCRIPTION OF THE DRAWINGS

The invention is illustrated by reference to the accompanying drawings in which:

Referring to FIG. 1 of the drawings, the film comprises a polymer substrate layer (1) having a heat-sealable layer (2) bonded to one surface (3) thereof, with particulate material (4) immediately below the surface of the heat-sealable layer.

Figure 1:
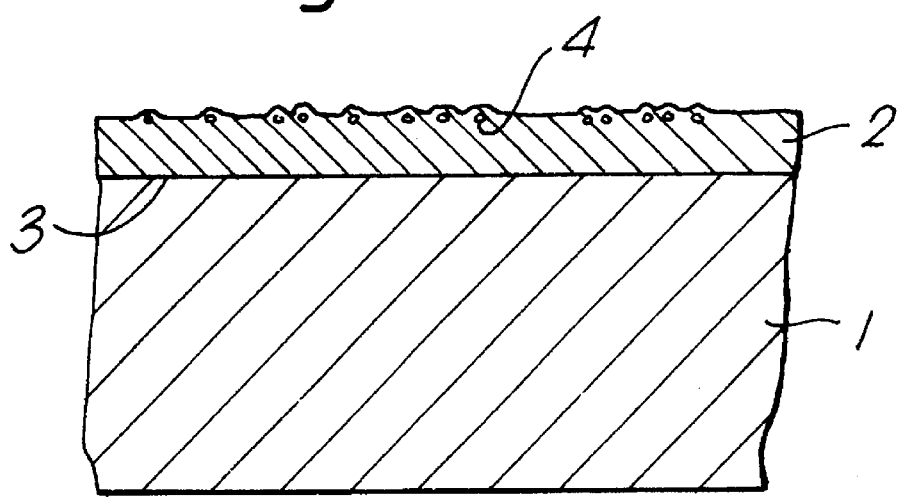
FIG. 1 is a schematic sectional elevation, not to scale, of a polymer film having a heat-sealable layer adhered directly to a first surface of the substrate.
Figure 2:
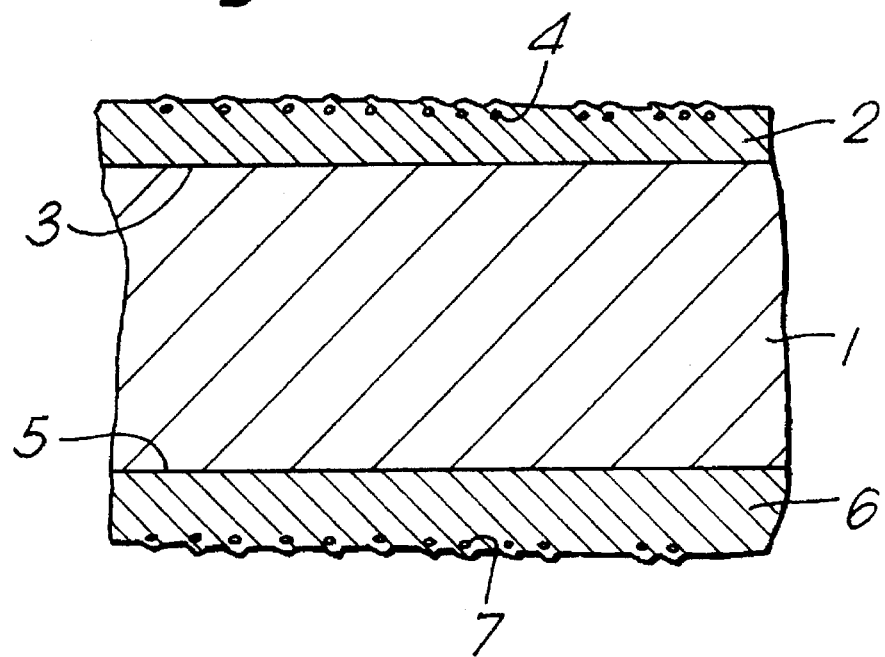
FIG. 2 is a similar schematic elevation of a polymer film with an additional heat-sealable layer adhered to the second surface of the substrate.

The film of FIG. 2 further comprises an additional heat-sealable layer (6), bonded to the second surface (5) of the substrate (1). The additional heat-sealable layer (6) also comprises particulate material (7) immediately below the surface of the layer.

The invention is further illustrated by reference to the following Examples.

EXAMPLE 1

Film composites comprising polyethylene terephthalate as the substrate and one heat-sealable layer comprising a copolyester of 82 mole % ethylene terephthalate/18 mole % ethylene isophthalate were prepared.

The aforementioned polyesters were prepared using a conventional process comprising direct esterification of ethylene glycol with an acid (ie terephthalic acid in the case of polyethylene terephthalate or a mixture of 82 mole % terephthalic acid and 18 mole % isophthalic acid in the case of the copolyester) followed by polycondensation. After terminating the polycondensation, the polymer was cut into small granules suitable for extrusion.

Film composites were produced from the above polyesters by a process of single channel coextrusion wherein streams of polyethylene terephthalate and the copolyester supplied by separate extruders were united in a tube leading to the manifold of an extrusion die and were extruded simultaneously through the die under conditions of streamline flow and without intermixing. The film composite emerging from the extrusion die was quenched immediately upon a water-cooled rotating metal drum having a polished surface and stretched to 3.6 times its original dimension in the direction of extrusion at a temperature of about 90° C. The stretched film was then coated with an 8% by weight aqueous dispersion of silica of average particle size 40 nm (Aerosil K330, Degussa) onto the heat-sealable layer surface. The longitudinally stretched film was then stretched transversely in a stenter oven to 4.2 times its original dimension at a temperature of about 100° C. The film composite was finally heat set under dimensional restraint in a stenter oven at a temperature of about 225° C.

The resulting film composite consisted of a biaxially oriented and heat-set polyethylene terephthalate substrate and an amorphous copolyester layer. Final film thickness was 15 µm, the copolyester layer being 3 µm thick. The film was subjected to the test methods described above and exhibited the following characteristics:

1) Protrusion peaks on the surface of the heat-sealable layer

Number=700 per $mm^2$ Average height=25 nm Average height/width=2.2 $\therefore 10^{-3}$ 2) Haze=2.7%

3) Static coefficient of friction of heat-sealable layer=0.63

4) Heat-seal strength of heat-sealable layer=275 $Nm^{-1}$

EXAMPLE 2

The procedure of Example 1 was repeated except that the polyethylene terephthalate substrate layer contained 1550 ppm of china clay of average particle size 0.8 µm, and the copolyester heat-sealable layer additionally contained 1250 ppm of china clay of average particle size 0.8 µm. The resultant film was subjected to the test methods described above and exhibited the following characteristics:

1) Protrusion peaks on the surface of the heat-sealable layer

Number=739 per $mm^2$ Average height=63 nm

2) Haze=6.7%

3) Static coefficient of friction of heat-sealable layer=0.56

4) Heat-seal strength of heat-sealable layer=250 $Nm^{-1}$

EXAMPLE 3

The procedure of Example 1 was repeated except that the polyethylene terephthalate substrate layer contained 18% by weight, based on the weight of the polymer, of a finely divided particulate barium sulphate filler having an average particle size of 0.4 µm. Final film thickness was 250 µm, the copolyester layer being 40 µm thick. The resultant film was subjected to the test methods described above and exhibited the following characteristics:

1) Protrusion peaks on the surface of the heat-sealable layer

Number=710 per $mm^2$ Average height=26 nm

2) Haze—not applicable, an opaque film

3) Static coefficient of friction of heat-sealable layer=0.58

4) Heat-seal strength of heat-sealable layer=1400 $Nm^{-1}$

EXAMPLE 4

This is a comparative example not according to the example. The procedure of Example 2 was repeated except that the silica coating stage was omitted and the polyethylene terephthalate substrate layer contained no china clay filler. Final film thickness was 75 µm, the copolyester layer being 12 µm thick. The resultant film was subjected to the test methods described above and exhibited the following characteristics:

1) Protrusion peaks on the surface of the heat-sealable layer

Number=26 per mm$^2$ Average height=26 nm Average height/width=0.6×10$^{-3}$

2) Haze=0.3%

3) Static coefficient of friction of heat-sealable layer=>1.2

4) Heat-seal strength of heat-sealable layer=590 Nm$^{-1}$

The above examples illustrate the improved properties of film composites according to the present invention.

We claim:

1. A method of producing a composite film comprising forming a substrate layer of polymeric material having on at least one surface thereof a heat-sealable layer, applying a particulate additive to the exposed surface of the heat-sealable layer, the particulate additive bonding to and/or penetrating into the heat-sealable layer, the exposed surface of the heat-sealable layer comprising greater than 100 surface protrusions per mm$^2$ produced by the particulate additive, the surface protrusions having an average peak height in the range from 5 to 400 nm measured from the average level of the surface of the heat-sealable layer.

2. A method according to claim 1 wherein the substrate layer and heat-sealable layer are formed by coextrusion.

3. A method according to claim 1 wherein the particulate additive is applied in the dry state or as a dispersion in an aqueous or organic solvent.

4. A method according to claim 1 wherein the exposed surface of the heat-sealable layer comprises less than 5000 surface protrusions per mm$^2$.

5. A method according to claim 3 wherein the exposed surface of the heat-sealable layer comprises from 400 to 2000 surface protrusions per mm$^2$.

6. A method according to claim 1 wherein the average peak height of the surface protrusions is in the range from 10 to 200 nm.

7. A method according to claim 1 wherein the average height/width of a protrusion peak is greater than 0.8×10$^3$.

8. A method according to claim 1 wherein the upper 1 µm surface layer of the heat-sealable layer comprises greater than 90% of the particulate additive.

9. A method according to claim 1 wherein the heat-sealable layer measured against itself has a heat-seal strength greater than 200 Nm$^{-1}$.

10. A method according to claim 1 wherein the heat-sealable layer comprises a copolyester of ethylene terephthalate and ethylene isophthalate.

11. A method of producing a composite film comprising forming a substrate layer of polymeric material having on at least one surface thereof a heat-sealable layer, applying a particulate additive having an average particle size in the range from 0.01 to 0.09 µm in the dry state or as a dispersion in an aqueous or organic solvent to the exposed surface of the heat-sealable layer, the particulate additive bonding to and/or penetrating into the heat-sealable layer, the exposed surface of the heat-sealable layer comprising greater than 100 surface protrusions per nm$^2$ produced by the particulate additive, the surface protrusions having an average peak height in the range from 5 to 400 nm measured from the average level of the surface of the heat-sealable layer.

12. A method of producing a composite film comprising forming a substrate layer of polymeric material having on at least one surface thereof a heat-sealable layer, applying a particulate additive bonding to and/or penetrating into the heat-sealable layer, the exposed surface of the heat-sealable layer comprising greater than 100 surface protrusions per nm$^2$ produced by the particulate additive, the surface protrusions having an average peak height in the range from 5 to 400 nm measured from the average level of the surface of the heat-sealable layer and wherein the upper 1 mm surface layer of the heat-sealable layer comprises greater than 90% of the particulate additive and the heat-sealable layer measured against itself has a heat-seal strength greater than 200 Nm$^{-1}$.

* * * * *